United States Patent [19]
Ryan

[11] Patent Number: 5,600,943
[45] Date of Patent: Feb. 11, 1997

[54] HIGH BRUSH MOWER

[76] Inventor: Cyril A. Ryan, 3050 Vincentia Rd., Palm Springs, Calif. 92262

[21] Appl. No.: 536,368

[22] Filed: Sep. 29, 1995

[51] Int. Cl.$^6$ .......................... A01D 34/66; A01D 34/73; A01D 34/82; A01D 34/83
[52] U.S. Cl. .................. 56/13.6; 56/2; 56/6; 56/11.6; 56/17.5; 56/320.2; 56/DIG. 9; 56/DIG. 20; 56/DIG. 24
[58] Field of Search ..................... 56/13.6, 11.6, 56/2, 6, 17.5, 320.1, 320.2, DIG. 9, DIG. 20, DIG. 24, 320

[56] References Cited

U.S. PATENT DOCUMENTS

| | | | |
|---|---|---|---|
| 3,564,822 | 2/1971 | Engler | 56/6 X |
| 3,601,958 | 8/1971 | Roof | 56/6 X |
| 4,424,661 | 1/1984 | Kulak | 56/13.6 X |
| 4,472,926 | 9/1984 | Siegrist et al. | 56/13.6 |
| 4,558,558 | 12/1985 | Horner, Jr. et al. | 56/11.6 X |
| 4,969,319 | 11/1990 | Hutchinson et al. | 56/DIG. 9 X |
| 5,005,344 | 4/1991 | McCracken . | |
| 5,016,722 | 5/1991 | Morita et al. . | |
| 5,042,236 | 8/1991 | Lamusga et al. | 56/2 X |

FOREIGN PATENT DOCUMENTS

| | | | |
|---|---|---|---|
| 80447 | 1/1956 | Denmark | 56/6 |
| 1475313 | 3/1967 | France | 56/6 |
| 1916431 | 11/1969 | Germany | 56/6 |

*Primary Examiner*—Dave W. Arola
*Assistant Examiner*—Christopher J. Novosad
*Attorney, Agent, or Firm*—Terrance L. Siemens

[57] ABSTRACT

A mower suitable for cutting high grass, brush, and like growth. The mower has a plurality primary cutting elements disposed ahead of a secondary cutting element. The primary cutting elements is that which first contacts growth, cutting this growth to a predetermined height. The secondary cutting element follows the primary cutting element, contacting the cut growth and cutting the same to a final, predetermined height less than that obtained by the first cut. The primary cutting elements are preferably unencumbered by a hood or guard, but preferably are partially encircled or surrounded at the front and sides by a bumper. The bumper prevents the mower from attempting to run over or cut rigid, immovable objects, such as trees, curbs, large stones, and the like. The primary and secondary cutting elements may be a singular element or plural elements arranged abreast of one another. The cutting elements may be rigid blades or flexible members, such as stranded metal, synthetic resin cords, or chains. The invention may comprise a mower incorporating the novel principles, or may be practiced by adding appropriate components to a pre-existing, conventional mower.

9 Claims, 3 Drawing Sheets

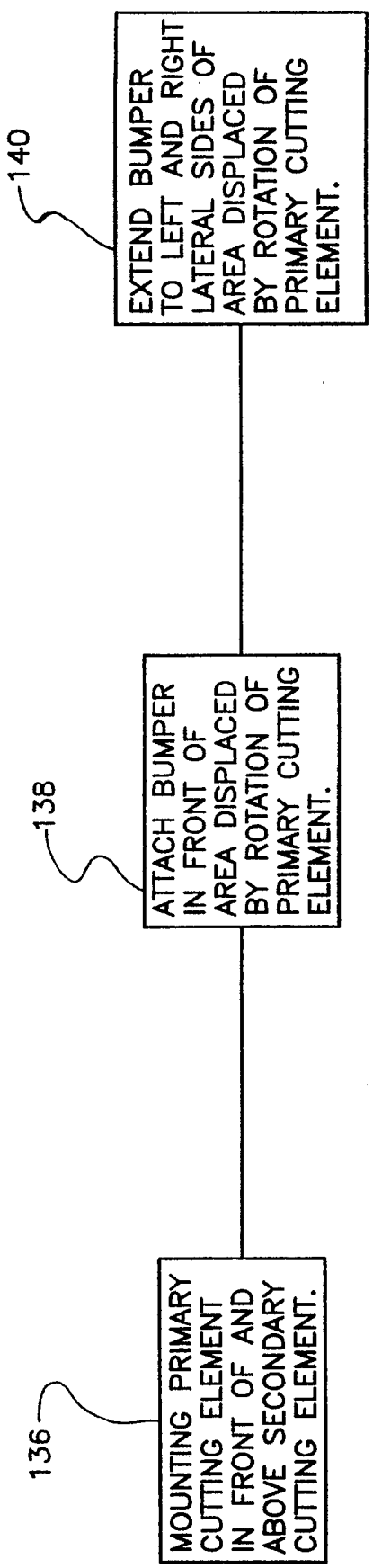

HIGH BRUSH MOWER

BACKGROUND OF THE INVENTION

1. Field of the Invention

The present invention relates to a mower. More particularly, the invention provides two sets of cutting blades, the first located at a higher level above the ground than the second. The first set of cutting blades is unencumbered by a skirt, thereby resisting clogging. The second blade leaves grass and brush at a final desired height above the ground.

2. Description of the Prior Art

Cutting of grass and brush for aesthetic or other purposes has long been the subject of many machines adapted for mowing. Commensurate with the area to be mowed, mechanized mowers have been provided with ever increasing sources of power and drive. Among the simplest of these machines is a manually propelled, powered mower having a singular blade directly driven by a motor shaft. The motor is typically a single cylinder internal combustion engine, or may be electric.

For mowing more extensive areas, self-propelled mowers have been provided. To further reduce the effort of the operator, riding mowers have been developed, and mowing units have been made attachable to tractors. To further increase the area which is cut in a single pass, plural rotary cutting blades have been ganged. This increases the span of the cutting blades, while minimizing the diameter of any one rotary blade. It also provides better conformity of cutting blades to uneven terrain.

A mower described in U.S. Pat. No. 3,601,958, issued to Earl O. Roof on Aug. 31, 1971, has three blades driven by V-belts, and enclosed within a hood formed by cooperating. The center blade, considered from the front view, is located forwardly of the right and left side blades. The purpose of this arrangement is to cause the respective swaths to overlap. There is no teaching that the various blades should cut to different heights, apart from accommodation of uneven terrain. By contrast, this teaching is central to the present invention. In the present invention, the first blades to encounter and cut grass and brush are not surrounded by a guard, hood, or skirt. By contrast, the blades of the Roof mower are so enclosed, except for a cuttings discharge chute.

Self-propelled, powered vehicles having attachable mowing units are also shown in U.S. Pat. Nos. 4,969,319, issued to Wayne R. Hutchison et al. on Nov. 13, 1960, U.S. Pat. No. 5,016,722, issued to Shigeru Morita et al. on May 21, 1991, and U.S. Pat. No. 5,042,236, issued to Gary R. Lamusga et al. on Aug. 26, 1991. Hutchison et al. provide a front or rear mounted mowing unit attached to a tractor unit by arms, and driven by a V-belt and pulley system. In an alternative embodiment, hydraulic power is employed to rotate the cutting blades. However, there is no teaching of sequentially disposed cutting blades, and therefore, of cutting grass first to one height, and subsequently to a lower height, as is practiced in the present invention. Also unlike the present invention, all blades are enclosed within a safety guard.

The mower of Morita et al. features triplex blades rotated by a V-belt system. The blades are arranged abreast of one another, all blades encountering and cutting grass simultaneously. The blades are covered by a hood, which is equivalent structurally to a typical safety guard, for the purpose of constraining cuttings to be collected in a grass catcher. There are no first and subsequent cutting blades, the first blade being unencumbered by a hood or guard, as occurs in the present invention.

The mower of Lamusga et al. also features plural blades disposed abreast, each enclosed in a guard. Lamusga et al. also lack first and subsequent cutting blades, the first blades being unencumbered by guards, as found in the present invention.

A mowing unit attachable to a fork lift or the like, and which has a singular blade, is described in U.S. Pat. No. 5,005,344, issued to Doc J. McCracken on Apr. 9, 1991. This blade is provided with outermost auxiliary blades intended to yield if a resisting object is encountered. The single blade must by definition cut at one elevation, unlike the first and subsequent blades of the present invention. Also unlike the present invention, this singular blade is partially enclosed in a housing or guard.

None of the above inventions and patents, taken either singly or in combination, is seen to describe the instant invention as claimed.

SUMMARY OF THE INVENTION

The present invention is intended to cope with tall or high grass and brush, and to mow the same in a single pass. The task of cutting extremely high growth differs in certain aspects from that of cutting relatively low growth. Low growth cutting is generally performed regularly on lawns for aesthetic purposes. Grass is cut to a final height in a single pass, and is exposed to a single cutting blade.

By contrast, cutting high growth is performed both for aesthetic purposes an also for maintaining control of excessive overgrowth on a plot of land. This type of activity is generally performed at great intervals of time, such as once each year. Ground that is maintained in this fashion is generally not subject to daily or frequent occupancy and human usage. Therefore, disposal of cuttings may be handled in a different manner than aesthetic trimming of a grass lawn in a constantly occupied area.

The novel mower incorporates a commercially available riding mower, and adds an auxiliary cutting unit to the mower. The auxiliary cutting unit is attached at the front of the riding mower. The cutting blades of the auxiliary unit are located at an elevation above the ground higher than that of the subsequent cutting blades. The subsequent cutting blades cut the grass to a final cut height lower than that achieved by the first or primary blades to encounter the uncut grass, those being the blades of the auxiliary unit. Thus, the first principle of the invention is that the novel mower cuts grass twice, to a first height by primary blades, and then to a second, lower height by subsequent or secondary blades.

A second principle of the invention is that the primary blades are unencumbered by a guard, hood, or skirt substantially enclosing the primary blades. Given extremely high grass, primary blades covered by a guard, hood, or skirt are far more apt to clog than are blades free of such structure.

Although guards are customarily provided for safety, this is a minor issue in the present circumstances. Firstly, given typical limited usage and occupation of land maintained in this fashion, likelihood of injury or damage arising from debris ejected from the blades at high speed is quite limited. Secondly, given the relatively great height of the primary blades, it is unlikely that a solid object capable of being forcibly ejected at great speed will be encountered by the primary blades.

In a preferred embodiment, a bumper peripherally surrounds the primary cutting blades. This bumper prevents the novel mower from attempting to cut an object too rigid to bend in response to contact with the bumper. Therefore, the novel mower is prevented from potentially damaging contact with trees, artificial poles, large stones, curbs, and like objects which are for practical purposes permanent and not subject to being mowed.

The present invention may be practiced by designing a mechanized mower incorporating the inventive principles. Alternatively, the invention is practiced by providing an accessory adapting an existing mower to include the inventive principles. An accessory unit having necessary structure to convert an existing mower to the novel mower, and a method for converting an existing mower are set forth.

It will be appreciated that as employed herein, the term "mower" embraces both machines specifically designed for and dedicated to mowing, and to tractors and like general purpose utility vehicles adapted for various tasks including towing mowing units. The novel principles set forth therein are readily adapted to the latter machine.

In a similar vein, the cutting element, which is typically a rigid steel blade, is not limited merely to rigid blades. The cutting elements may take the form of flexible cables, such as stranded steel, chain, or synthetic resin cables, such as nylon cords. It would further be possible to make cutting elements interchangeable among the various types possible.

Accordingly, it is a principal object of the invention to provide a mower for mowing extremely tall growth.

It is another object of the invention to prevent clogging of blades when mowing tall growth.

It is a further object of the invention to provide a bumper preventing rigid vertical objects from coming into contact with mower blades.

Still another object of the invention is to convert a conventional riding mower to be able to cut tall growth.

An additional object of the invention is to provide both rigid and flexible cutting elements.

It is again an object of the invention that cutting elements be interchangeable among the possible types of cutting elements.

Yet another object of the invention is to provide an attachable unit for converting a conventional mower into the novel mower adapted to cut high grass.

It is again an object of the invention to have the mower be a powered, self-propelled, riding mower.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is a block diagram summarizing important steps in converting a conventional mower to incorporate the inventive concept.

DETAILED DESCRIPTION OF THE PREFERRED EMBODIMENTS

Figure 1:
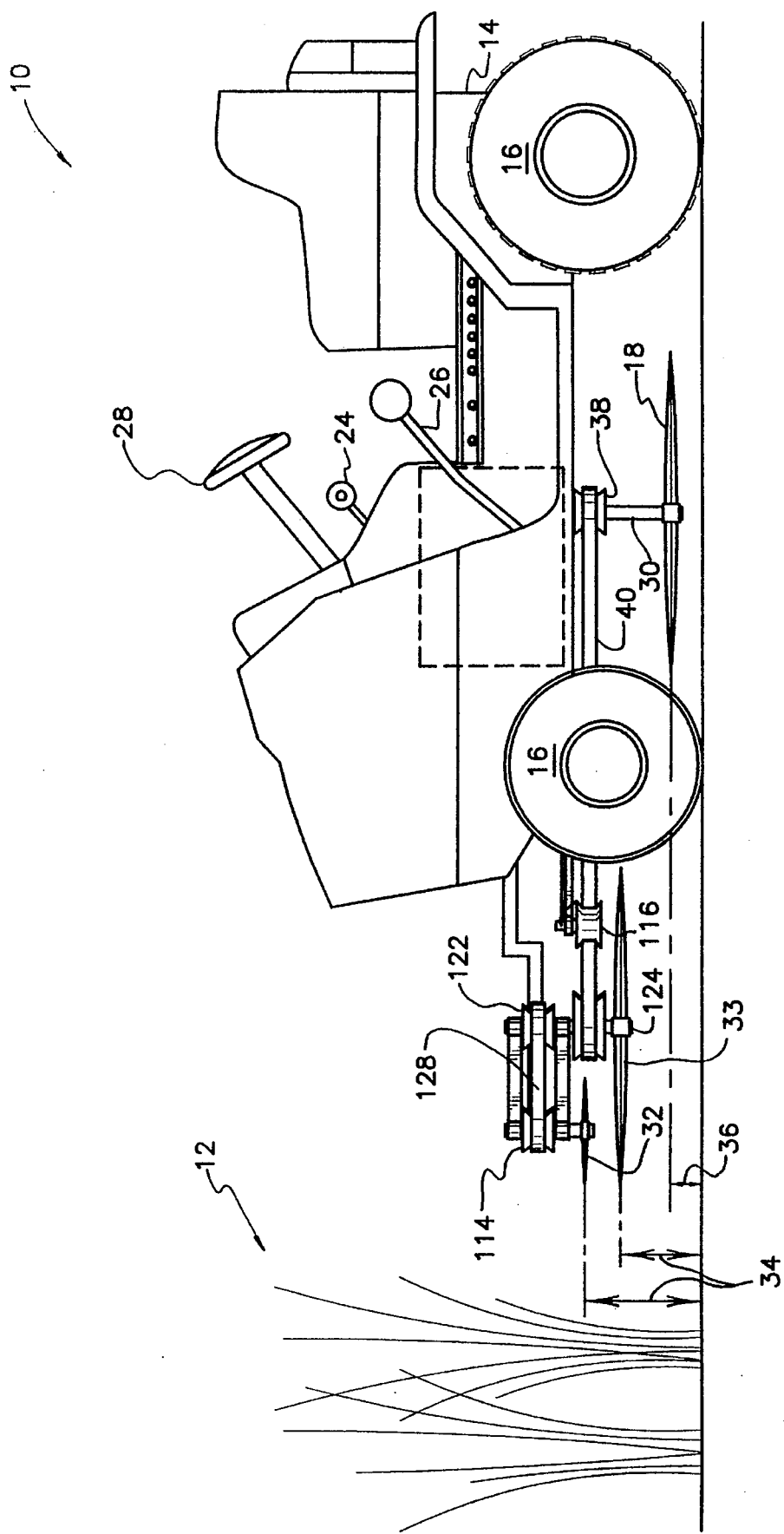
FIG. 1 is a diagrammatic, side elevational view of the invention, illustrating a first embodiment incorporating the novel cutting scheme in a riding mower.

Turning now to FIG. 1 of the drawings, there is depicted a mower 10 adapted for cutting high grass 12 and like growth. Mower 10 is a riding mower, having a frame 14, wheels 16 for rolling mower 10 along the ground, a cutting element 18, a seat 20, a motor 22 for driving wheels 16 and cutting element 18, and controls. The controls include a steering wheel 28, an ignition switch 24 for starting motor 22, and a lever 26 for operating a clutch (not shown) for connecting and disconnecting power from motor 22 to wheels 16 and cutting element 18.

It must be emphasized that riding mowers are conventional, having these and possibly other controls, and that these components are recited for convenience only. The precise nature of the controls and conventional features of a riding mower may vary among the various models and embodiments presently known without affecting the novel improvements set forth hereinafter.

It will be seen that cutting element 18 is disposed beneath frame 14, and is typically covered by a hood or guard which has been omitted from this Drawing Figure to reveal critical components. Cutting element 18 has a shaft 30 driven either directly or indirectly by motor 22.

The present invention improves upon the conventional mower by the addition of a primary cutting elements 32, 33 at the front of riding mower 10. Primary cutting elements 32, 33 need not be located at the front of mower 10 as long as they is forward of cutting element 18, so that primary cutting elements 32, 33 are the first cutting elements to encounter growth 12. Cutting element 18 is the subsequent cutting element to encounter growth remaining in the swath cut by primary cutting elements 32, 33 and will hereinafter be referred to as the secondary cutting element 18. Cutting element 18 is disposed both behind and in longitudinal alignment cutting element 33. Growth is thus first encountered by cutting elements 32 and 33 and the same growth is subsequently encountered by cutting element 18.

Primary cutting elements 32, 33 cut growth 12 to a level indicated by arrows 34. Secondary cutting element 18 is positioned at a height above the ground lower than that of primary cutting elements 32, 33 the cutting height attained by secondary cutting element 18 being indicated by arrow 36. This arrangement reduces the burden of cutting high growth 12 and discharging cuttings by one cutting element which is conventionally surrounded by a guard or hood.

Instead, primary cutting element is unencumbered by such a guard or hood, and also is located well above the final cutting height established by secondary cutting element 18. The higher position of primary cutting element 32 enables uncut stubble to bend beneath and yield to primary cutting elements 32, 33 rather than to obstruct a cutting element and to accumulate in and clog a hood or guard. Thus, a principal embodiment is seen to include a mower having a primary cutting element and a secondary cutting element, the former located at a greater height above the ground than the latter.

Primary cutting elements 32, 33 is preferably belt driven by a pulley 38 located on shaft 30, or located at any suitable place for obtaining rotary power from motor 22. A belt 40 engages pulley 38, and transmits rotary power to the front of mower 10 for rotating primary cutting elements 32, 33.

Figure 2:
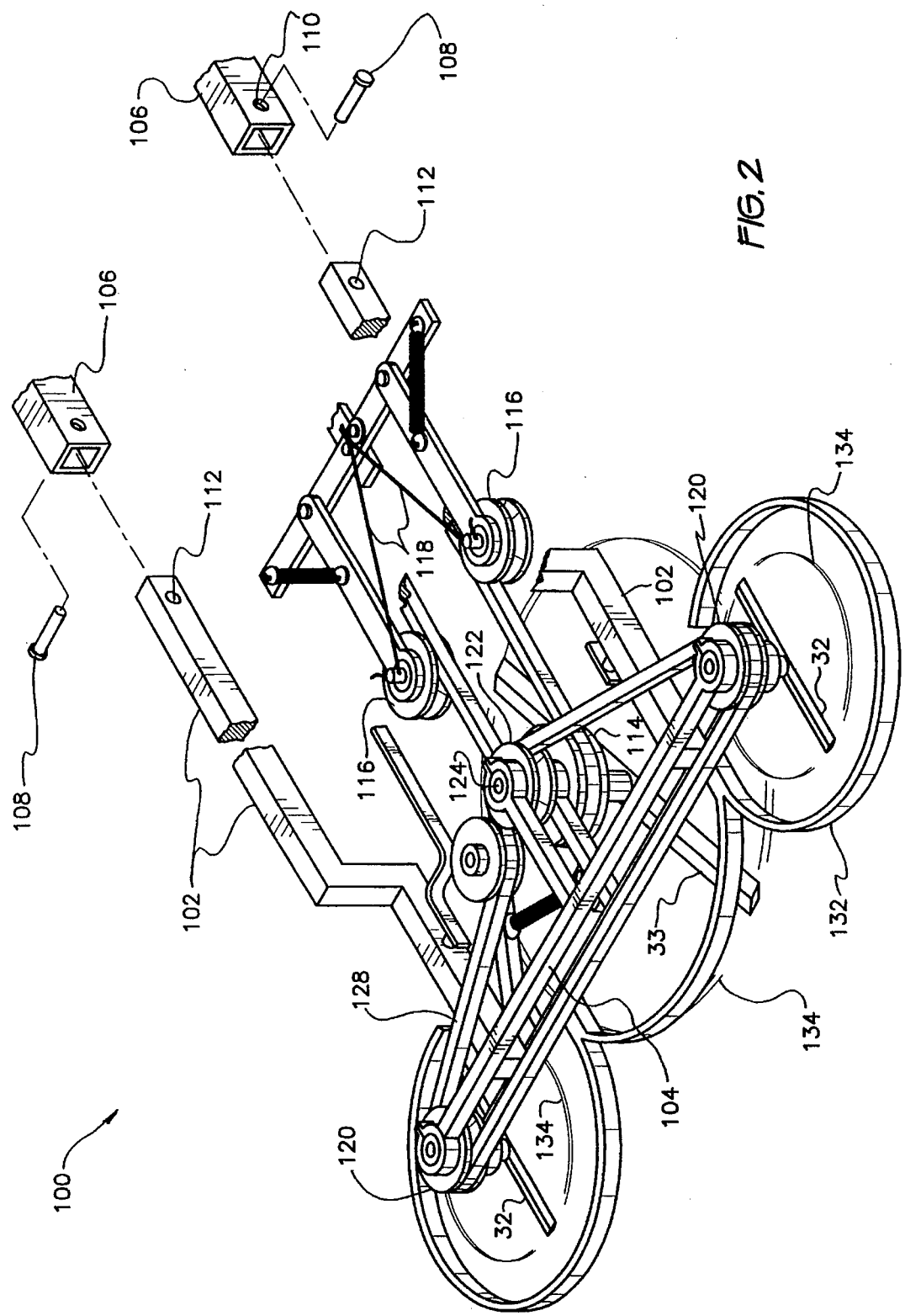
FIG. 2 is a perspective, partially exploded view of components required to convert a conventional mower to incorporate the inventive concept, illustrating a second embodiment of the invention, and illustrating an optional bumper.

Components for driving and supporting primary cutting elements 32, 33 are better understood with reference to FIG. 2. A frame 100 having two longitudinal arms 102 and a cross member 104 spanning and connecting arms 102 support primary cutting elements 32, 33. Arms 102 extend rearwardly to mower 10 and are securely attached thereto. Attachment may be performed by welding or bolting arms 102 solidly to mower 10, or by providing cooperating structure for receiving and immobilizing arms 102 to mower 10. FIG. 2 illustrates cooperating structure comprising two sockets 106, which are welded, bolted, or otherwise solidly and permanently fixed to mower 10 at a suitably strong location.

Arms 102 penetrate sockets 106, and are pinned or bolted therein by pins or threaded fasteners 108 penetrating holes 110 formed in sockets 106 and holes 112 formed in arms 102.

Primary cutting element 32, which, in the embodiment of FIG. 2 comprises two rigid blades arranged on opposite sides of a cutting element 33 are driven by belt 40 as it passes by pulleys 114. Pulleys 114 are journaled in a member of frame 100. Belt 40 is maintained at effective tension by a tensioning pulley or roller 116, which is pivotally journaled in a member of frame 100. Pulley 116 is adjusted by drawing on a cable 118, thereby swinging pulley 116 into contact with drive belt 40. Cable 118 is preferably a Bowden cable, and is controlled in any suitable way, such as by fastening to a handle (not shown) mounted in the dashboard of mower 10.

It would be possible to rotate or drive pulleys 120 by belt 40, but it is preferred instead to provide the following indirect drive scheme. Belt 40 drives a pulley 114 which is mounted on a shaft 124 journaled in a member of frame 100. Shaft 124 drives pulley 122. A drive belt 128 is driven by pulley 122, and in turn drivingly engages pulleys 120.

In a further improvement to the invention, a bumper 132 is provided at the outer periphery of the areas 134 swept or displaced by rotation of primary cutting elements 32, 33. These areas vary dependent upon the number and arrangement of individual elements of primary cutting elements 32. Bumper 132 preferably conforms closely to the periphery of areas 134. Bumper 132 is solidly fixed to frame 100 by welding, bolting, or in any other suitable way.

The principal purpose of bumper 132 is to prevent mower 10 from being driven into or over objects which would damage mower 10. Therefore, bumper 132 spans the entire front of primary cutting elements 32, 33. Since mower 10 may be turned, some degree of protection is preferably provided at the lateral sides of primary cutting element 132. To this end, bumper 132 extends along the right and left lateral sides of primary cutting element 132.

Bumper 132 differs from a conventional hood or guard (not shown) typically provided for mower blades in that it is essentially linear in nature, and open at the top. It is fabricated from a suitable stock material such as steel rod stock, and therefore has a height dimension equal to the diameter of the rod or other stock material. There is no specific requirement for height above the ground, as occurs with the skirt of a mower blade guard. The height of the bumper need not coincide with the height of the cutting elements it protects, since it merely arrests forward motion of mower 10 when contacting an obstacle.

The components set forth in the discussion of FIG. 2 provide a suitable conversion accessory for converting a conventional riding mower (not separately shown) to the inventive purpose. For any given conventional mower, a suitable, solid location is found for mounting sockets 106, for drilling holes for accepting threaded fasteners, or for direct welding of arms 102 to the mower. Frame 100 is then appropriately fastened to the conventional mower, and primary cutting elements 32, 33 are assembled on frame 100, and drive belts are installed and tensioned. In designing or assembling frame 100, care is exercised to locate primary cutting elements 32, 33 at an appropriate height above that of secondary cutting element 18 (see FIG. 1).

FIG. 3 summarizes the process of converting a conventional mower to a mower suitable for cutting high growth. Reading from left to right, the first step 136 requires providing the primary cutting elements 32, 33 of FIG. 1 or FIG. 2, and mounting the same to the conventional mower in front or ahead of the secondary cutting element such that the cutting height of the primary cutting elements is above that of the secondary cutting element.

In an optional further step 138, a bumper is attached so as to be positioned along or guard the front of the area displaced by rotation of the primary cutting elements.

In a further optional step 140, the bumper of step 138 is extended laterally towards the rear, thus guarding the lateral sides of the area displaced by rotation of the primary cutting elements.

Obviously, many variations and modifications may be made to the invention without departing from the inventive concept. For example, either or both of the primary and secondary cutting elements may comprise a single element, or several elements. It may, for example, be desired to limit the overall diameter of a rapidly rotating blade in order to avoid balancing problems, or to limit overall length. Primary or secondary cutting elements, or both, where provided as several elements, may be arranged abreast of one another, or in leading and trailing fashion, if the latter arrangement is desired for overlapping the cut, or for other purposes.

In a further example, the primary cutting elements may be rigidly fastened to the mower, or may be mounted on a wheeled unit pushed by but not carried above the ground by the mower.

It is to be understood that the present invention is not limited to the embodiments described above, but encompasses any and all embodiments within the scope of the following claims.

I claim:

1. A mower for cutting high grass, said mower comprising:

a frame;

a motor supported on said frame;

wheels for rolling said mower along the ground, said wheels supported by said frame;

a primary cutting element mounted to said mower, and rotatably connected to said motor; and a secondary cutting element mounted to said mower behind said primary cutting element, said secondary cutting element positioned at a height lower than that of said primary cutting element.

2. The mower according to claim 1, said wheels drivingly connected to said motor, whereby said mower is a self-propelled mower.

3. The mower according to claim 2, further comprising a seat supported on said mower and driving controls mounted to said mower, whereby said mower is a riding mower.

4. The mower according to claim 1, further comprising a bumper mounted to said mower, said bumper encircling front and lateral sides of said primary cutting element, said primary cutting element remaining substantially uncovered at the top and at a rear side.

5. The mower according to claim 1, said secondary cutting element disposed both behind and in longitudinal alignment with said primary cutting element, whereby growth is first encountered by said primary cutting element, and the same growth is subsequently encountered by said secondary cutting element.

6. The mower according to claim 1, said primary cutting elements being located forwardly of said wheels.

7. A method of converting a conventional riding mower into a mower suitable for cutting high grass, said method comprising the step of:

a) providing and mounting a primary cutting element on the riding mower, the primary cutting element located forward of the cutting element provided originally and integrally with the riding mower, the primary cutting element positioned at a cutting height above that of the original, integral cutting element.

8. The method according to claim 7, further comprising the step of:

b) attaching a bumper at the front of a periphery of an area displaced by rotation of the primary cutting element.

9. The method according to claim 8, further comprising the step of:

c) extending the bumper to partially surround the periphery of the area displaced by rotation of the primary cutting element at the right and left lateral sides of the periphery.

* * * * *